(12) United States Patent
Barrett

(10) Patent No.: US 12,710,114 B2
(45) Date of Patent: Aug. 18, 2026

(54) DESKTOP CORD ORGANIZER

(71) Applicant: Nicholas Barrett, Naples, FL (US)

(72) Inventor: Nicholas Barrett, Naples, FL (US)

(*) Notice: Subject to any disclaimer, the term of this patent is extended or adjusted under 35 U.S.C. 154(b) by 28 days.

(21) Appl. No.: 18/826,406

(22) Filed: Sep. 6, 2024

(65) Prior Publication Data

US 2024/0426401 A1 Dec. 26, 2024

Related U.S. Application Data

(63) Continuation-in-part of application No. 29/925,034, filed on Jan. 22, 2024, now Pat. No. Des. 1,102,259, and a continuation-in-part of application No. 18/465,082, filed on Sep. 11, 2023, now Pat. No. 12,281,737, which is a continuation of application No. 17/877,961, filed on Jul. 31, 2022, now Pat. No. 12,013,063.

(60) Provisional application No. 63/556,284, filed on Feb. 21, 2024, provisional application No. 63/227,507, filed on Jul. 30, 2021.

(51) Int. Cl.
*F16L 3/223* (2006.01)
*F16L 3/22* (2006.01)

(52) U.S. Cl.
CPC ............. *F16L 3/223* (2013.01); *F16L 3/2235* (2013.01); *F16L 3/22* (2013.01)

(58) Field of Classification Search
CPC ........... F16L 3/223; F16L 3/2235; F16L 3/22; A61M 39/08; A61M 39/24; A61M 25/02; A61M 5/1415; A61M 5/1418
See application file for complete search history.

(56) References Cited

U.S. PATENT DOCUMENTS 4,769,876 A 9/1988 Platt
5,316,246 A * 5/1994 Scott ....................... F16L 3/223 248/90
6,012,940 A 1/2000 Wheeler
6,238,235 B1 5/2001 Shavit et al.
6,360,051 B1 * 3/2002 Daoud ............... G02B 6/44785 385/136
D488,054 S 4/2004 Myers
H2203 H 10/2007 Borchardt
7,320,681 B2 * 1/2008 Gillis .................... A61M 25/02 604/174
D568,723 S 5/2008 Morgan
7,394,963 B2 7/2008 Hartlef
D612,225 S 3/2010 Forte
D638,690 S 5/2011 Hoek
(Continued)

FOREIGN PATENT DOCUMENTS

WO 2012135075 A1 10/2012

*Primary Examiner* — Nkeisha Smith
(74) *Attorney, Agent, or Firm* — ASLAN LAW, P.C.

(57) ABSTRACT

A desktop organizer, intended for use in managing mobile device cables, in holding writing implements and earpieces, and in standing up mobile devices, has a main body that is optionally made of elastomeric material. The main body optionally contains a weight in a weight cavity. The main body is flexible. The main body has vertical end channels and cable channels. The cable channels have a smaller cross section than the end channels. In some versions, the end channels or the cable channels have features that make it easier to put items or cables in the channels. The main body may have a bottom channel that allows it to sit atop cords and keep them corralled.

17 Claims, 17 Drawing Sheets

(56) References Cited

U.S. PATENT DOCUMENTS

D638,691 S 5/2011 Hoek
D638,692 S 5/2011 Hoek
D639,145 S 6/2011 Hoek
D639,146 S 6/2011 Hoek
D640,527 S 6/2011 Hoek
D644,501 S 9/2011 Chen
8,020,259 B2 9/2011 Ho
D657,869 S 4/2012 Mammen
8,294,030 B2 10/2012 Pollard, Jr.
8,342,459 B2 1/2013 Garrison et al.
8,523,824 B2 * 9/2013 Teirstein ............... A61M 25/02 604/174
D691,875 S * 10/2013 Ganski .......................... D8/356
D691,878 S 10/2013 Ganski
8,853,532 B2 10/2014 Eshima
D720,606 S 1/2015 Mathews
8,998,151 B2 4/2015 Hoek
D728,349 S 5/2015 Lake
D732,935 S 6/2015 Egami
D743,048 S 11/2015 Kuran
D749,209 S 2/2016 Uhlenkamp
D755,043 S 5/2016 Bailey
D774,002 S 12/2016 Hsieh
9,575,278 B2 * 2/2017 Leclerc ............. G02B 6/44785
9,618,143 B2 4/2017 Noble
D790,127 S 6/2017 Verleur
9,783,124 B2 10/2017 Catlin
D803,164 S 11/2017 Noble
9,853,436 B2 12/2017 Simon
9,951,888 B2 * 4/2018 Boriack ................... F16L 3/13
D826,164 S 8/2018 Mastel
D835,497 S 12/2018 Rindy et al.
10,300,248 B2 5/2019 Taylor
D852,354 S 6/2019 Wrangmark
10,309,553 B1 6/2019 Schwalbe
D853,336 S 7/2019 Barram
D858,457 S 9/2019 Maggard
10,433,926 B2 * 10/2019 Recanati ............... A61B 50/20
D866,480 S 11/2019 Hoshikawa
D886,991 S 6/2020 Kindler
D886,992 S 6/2020 Kindler
D907,988 S 1/2021 Yu
D909,188 S 2/2021 Kou
D910,572 S 2/2021 Yang
D928,311 S 8/2021 McVaney
11,095,104 B2 8/2021 Frierson
D930,459 S 9/2021 Breines
11,134,775 B2 10/2021 Weikert
D941,251 S 1/2022 Wu
D944,629 S 3/2022 Barrett
D969,311 S 11/2022 Jansson
D1,000,609 S 10/2023 Jansson
D1,000,610 S 10/2023 Jansson
D1,008,003 S 12/2023 Glickfield
D1,016,756 S 3/2024 Steussloff
D1,025,755 S 5/2024 Barrett
12,013,063 B2 6/2024 Barrett
12,281,737 B2 * 4/2025 Barrett ................... F16L 3/223
2001/0035295 A1 11/2001 Cipollone
2003/0132352 A1 * 7/2003 Weaver ............... A61G 7/0503 248/68.1
2004/0118982 A1 6/2004 Shillings
2005/0173597 A1 * 8/2005 Farrell ................... F16L 3/223 248/68.1
2005/0189453 A1 9/2005 DeGuevara
2007/0235597 A1 * 10/2007 Winchester ............. F16L 3/223 248/68.1
2009/0065249 A1 * 3/2009 Silvers .................. H02G 3/305 174/72 A
2010/0132979 A1 6/2010 Chen
2010/0200273 A1 * 8/2010 Seil ......................... H02G 3/32 174/135
2011/0147542 A1 6/2011 Hoek
2020/0080664 A1 3/2020 Perry
2020/0313411 A1 10/2020 Williams
2021/0116053 A1 * 4/2021 Lindmark ........... H02G 3/0456
2023/0012185 A1 * 1/2023 Meng ...................... H02G 3/32
2023/0417345 A1 12/2023 Barrett
2025/0015572 A1 * 1/2025 Yang .................... F16L 3/2235

* cited by examiner

DESKTOP CORD ORGANIZER

CROSS-REFERENCE TO RELATED APPLICATIONS

This application claims the benefit of and is a continuation-in-part of U.S. Utility application Ser. No. 18/465,082 filed on Sep. 11, 2023 (the '082 application). The '082 application is a continuation of U.S. Utility patent application Ser. No. 17/877,961 filed Jul. 31, 2022 (the '961 application), now U.S. Pat. No. 12,013,063 issued Jun. 18, 2024. The '961 application is a non-provisional of U.S. Provisional Application No. 63/227,507 filed Jul. 30, 2021 (the '507 application). In addition, this application claims the benefit of and is a continuation-in-part of U.S. Design application Ser. No. 29/925,034 filed on Jan. 22, 2024 (the '034 application). Moreover, this application is a non-provisional of U.S. Provisional Application No. 63/556,284 filed Feb. 21, 2024 (the '284 application). The entire disclosures of the '082 application, the '961 application, the '507 application, the '034 application, and the '284 application are incorporated herein, in their entireties, by this reference thereto.

This application is related to U.S. Design application Ser. No. 29/758,940 filed on Nov. 19, 2020, now U.S. Design Pat. D944,629 issued Mar. 1, 2022. This application is also related to U.S. Design application Ser. No. 29/863,908 filed Dec. 23, 2022, now U.S. Design Pat. D1,025,755 issued May 7, 2024, a continuation of the above-mentioned '961 application.

BACKGROUND

Existing desktop organizers for cords often lack versatility. Traditional holders for these items frequently require precise positioning (utilizing unwanted adhesive) or are limited in functionality. Additionally, separate pen holders, phone stands, and organizers often clutter desk surfaces and lack integrated functionality.

SUMMARY

This summary introduces a selection of high-level concepts, in simplified form, which are further described below in the detailed description. This summary is not intended to identify any essential features of the claimed subject matter.

Various embodiments (although not necessarily all) feature a main body of elastomeric material. Various embodiments optionally include a weight in the main body.

In various embodiments, end channels on the left and/or right sides of the main body have arms that usefully flex to grip or hold objects such as mobile devices, tablets, number keypads, pens, markers, ear buds, nick-nacks, writing implements, wireless earpieces, business cards, pads of sticky notes, or other items.

Various embodiments provide cable channels that are sized to retain cables such as mobile device charging cables, power cables, data cables, or the like. These cable channels also hold business cards or other thin items.

Various embodiments provide a wide channel underneath the main body, referred to below as a bottom channel or channels. The bottom channel in such embodiments allows the main body to capture several cables or cords and retain them underneath.

In various embodiments, a deck surface helps hold up the connectors of cables and cords, keeping them neater, protected, and better-supported.

Although the discussion below and the drawings combine the foregoing features in a single, concrete device, not all of these features need be present for a given device to fall within the spirit of the invention.

The desktop cord or cable organizer according to the various embodiments herein combines stable phone stand functionality with convenient places for the types of desk items already mentioned and others as well, offering an organized and clutter-free workspace experience.

In one embodiment, a desktop cord organizer has a main body with dimensions, the dimensions of the main body including a main body length along a first axis, a main body width along a second axis perpendicular to the first axis, and a main body height along a third axis perpendicular to the first axis and to the second axis. The first axis and the second axis define a first plane, the first axis and the third axis define a second plane, and the second axis and the third axis define a third plane. The first axis, the second axis, and the third axis intersect at a common reference point of the main body and define axes of the main body. The main body also has pairs of sides including a first pair of the sides, a second pair of the sides, and a third pair of the sides, the first pair of the sides being a main body front side before the second plane and a main body rear side behind the second plane, the second pair of the sides being a main body top side above the first plane and a main body bottom side below the first plane, and the third pair of the sides being a main body left side and a main body right side. The first pair of the sides, the second pair of the sides, and the third pair of the sides define the sides of the main body. The main body is made of flexible material. The main body also has a first end channel communicating between the main body top side and the main body bottom side. The first end channel has a first end channel passage that communicates from an interior of the first end channel to outside of the main body through one of the third pair of the sides.

In an embodiment, the desktop cord organizer also has a cutout, at the main body bottom side, defining a bottom channel.

In an embodiment, the desktop cord organizer also has a second end channel communicating between the main body top side and the main body bottom side and the second end channel has a second end channel passage that communicates between that same pair of the sides.

In another embodiment, the desktop cord organizer also has a divider that separates the first end channel from the second end channel and extends in a direction parallel to the first axis.

In another embodiment, the first end channel has a first proximal end channel wall and a first distal end channel wall, the first proximal end channel wall being nearer the common reference point than the first distal end channel wall. Here, the first distal end channel wall is formed by a first arm.

In a more specific embodiment, the divider has a divider grip that defines part of the first end channel.

In an embodiment, the first arm has a first arm grip at its end.

Yet another embodiment of the desktop cord organizer provides for the main body to have a deck that extends parallel to the first plane at a deck level. Islands extend generally parallel to the third axis, upward from the deck level to an island top level. A first cable channel is formed between two adjacent islands.

In a more specific embodiment, the first cable channel has a first cable channel passage that communicates from an interior of the first cable channel to outside of the main body through the main body top side.

In another specific embodiment, the first cable channel has a rounded, teardrop cross section.

Yet another specific embodiment provides a second cable channel between one of the islands and a main body extension. Here, the second cable channel has a second cable channel passage that communicates from the interior of the second cable channel to the outside of the main body through the main body top side.

In still another specific embodiment, the first cable channel has a respective cross section different in size from the respective cross section of the second cable channel.

In a further embodiment, the main body is made of an elastomeric material.

More specifically, the desktop cord organizer may have an optional weight cavity in the interior of the main body.

A weight may reside in the weight cavity, and it may be removable.

In a more specific version, the weight is of a material that has a respective density greater than the respective density of the main body.

In an even more specific version, the weight may be made of steel.

In another variation, there is a mobile device charger in the weight cavity.

Still another variation puts a speaker in the weight cavity.

In yet another variation, the desktop cord organizer has an internal light source in the main body and also a light controller that is adapted to control the light source. A radio component is adapted to provide commands, to the light controller, that it receives through an app or the like.

BRIEF DESCRIPTION OF THE DRAWINGS

The drawings are included to provide a better understanding of the description below and constitute a part of this specification. The drawings illustrate example implementations of the disclosure and, with the description, explain the principles of the disclosure.

FIG. 10 shows a front side elevation view of the weight for the desktop cord organizer, and also a back side elevation view of the weight, according to an embodiment.

FIG. 12 shows a left side or a right side elevation view of the weight for the desktop cord organizer of FIG. 11.

DETAILED DESCRIPTION

Figure 1:
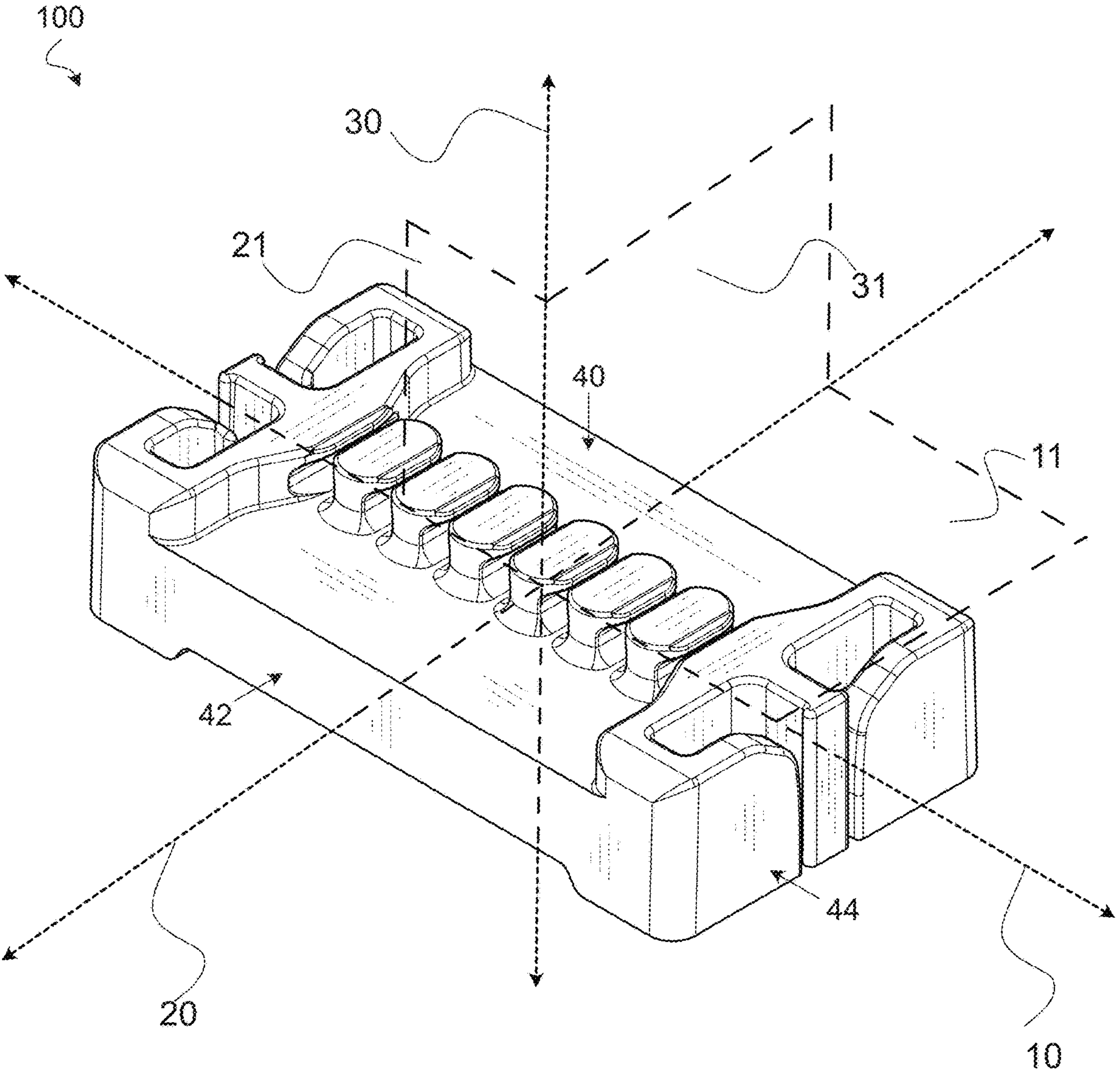
FIG. 1 shows a perspective view of a desktop cord organizer according to an embodiment from the perspective of the front side, right side, and top side, overlaid by a coordinate system.

This section teaches the concepts of the invention through various examples. The extent of legal protection for the invention should be viewed in the light of the appended claims.

A concrete implementation of an embodiment appears in FIGS. 1-17. In this embodiment, an elongate, flexible, brick-shaped main body optionally houses a weight. The main body's material density allows for its constituent parts to deform under force, but it returns to its original shape after the force ceases. In embodiments in which a weight is used, the weight's material density is relatively higher than that of the main body and may ideally be inflexible. In an embodiment that has only a single weight or multiple weights that together may be thought of as a single weight, the weight gives this embodiment enough mass to stop it from being easily dragged from a surface by typical mobile device cords and to let it be stable as it holds up mobile devices like cell phones using the arms described below. Because this illustrated embodiment has a flexible main body and a more dense, inflexible weight, the overall apparatus has deformable outer parts but a substantial, stiff core that helps the device keep its overall shape. The main body's material is flexible and may be thought of as having a first density. The weight may be thought of as having a second density. The second density exceeds the first density in various embodiments, allowing the weight to provide significant mass in a small amount of space. The weight may be steel, for example. When the main body has a weight, it is accommodated in a weight cavity.

The weight in the illustrated embodiment and others has various shapes appropriate to the specific embodiment. In some alternative embodiments, more than one weight fits inside the main body. In some alternative embodiments, the main body has more than one weight. In one embodiment, the main body opens up to allow the user to insert, remove, or replace the weight.

The main body, made of an elastomer such as natural rubber or a synthetic rubber like silicone rubber in various embodiments, has a grippy nature that achieves a high degree of friction between the outside of the main body and the surface upon which the device rests. The way the material grips the surface helps resist forces that may try to urge the device along the surface and over any nearby edge. At least the parts of the organizer that flex and the surfaces that contact other surfaces, such as the top of a desk or nightstand, should comprise the elastomeric material.

In various embodiments, the user or the manufacturer of the device inserts the weight into a cavity in the main body. In various embodiments, an adhesive fixes the weight in place. In various embodiments, the main body is molded in two parts; the two parts are placed around the weight and integrated together. In another embodiment, the weight is placed within a mold and the main body is formed by injecting the elastomeric material inside the mold. Instead of being molded, the main body may be formed through additive or subtractive manufacturing techniques.

Figure 4:
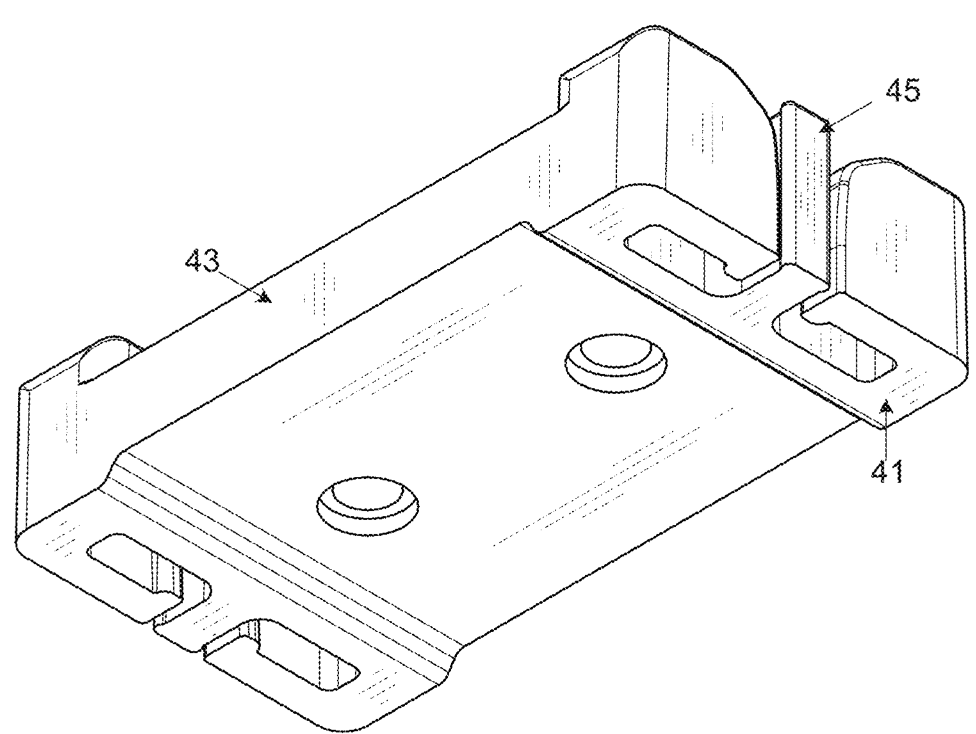
FIG. 4 shows a perspective view of a desktop cord organizer according to an embodiment from the perspective of the rear side, left side, and bottom side.
Figure 8:
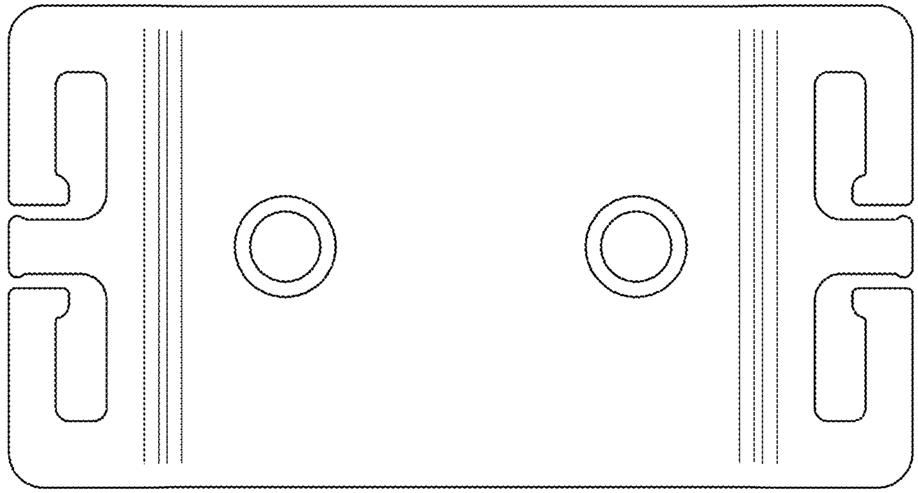
FIG. 8 shows a bottom view of the desktop cord organizer, according to an embodiment.

The views in FIGS. 4 and 8 depict an embodiment in which part of the weight is visible from the bottom side 41. The weight may be disposed totally inside the main body and not visible from the outside thereby giving the organizer a more aesthetically pleasing look.

The weight depicted in FIGS. 2, 3, 4, 5, 7, and 8 has holes in it to simplify manufacturing. These holes are not required in all embodiments that have weights. If holes are used, the shape of the hole or holes and their number may vary according to the manufacturing approach.

Embodiment 1

FIG. 1 shows a three-dimensional, Cartesian coordinate system overlaid on the organizer in which the main body 100 has a main body length along a first axis 10, a main body width along a second axis 20 perpendicular to the first axis, and a man body height along a third axis 30 perpendicular to the first axis and to the second axis. These are the dimensions of the cord organizer. The linear distance along the main body length is greater than that of the main body width unless they are equal to each other. The first axis, the second axis, and the third axis intersect at a common reference point of the organizer and define the organizer's axes. The common reference point may be thought of as indicating a central part of the main body. In this coordinate system, the first axis 10 and the second axis 20 define a first plane 11. The first axis 10 and the third axis 30 define a second plane 21. The second axis 20 and the third axis 30 define a third plane 31. The first plane, the second plane, and the third planes define planes of the organizer.

The main body generally has three pairs of sides. See FIG. 1 and FIG. 4. A first pair of sides includes the front side 42 visible in FIG. 1 in a plane parallel to the third plane 31 and a rear side 43 that is behind this plane and hidden (but visible in FIG. 4). A second pair of sides includes the top side 40 visible in FIG. 1 in a plane parallel to the first plane 11 and a bottom side 41 that is below the first plane and shown in FIG. 4. A third pair of sides include a left side 45 and a right side 44 on alternate sides of the second plane 21. FIG. 1 shows the main right side 44, and the left side 45 appears in FIG. 4. The first pair of sides, the second pair of sides, and the third pair of sides generally define the various sides of the main body.

Figure 2:
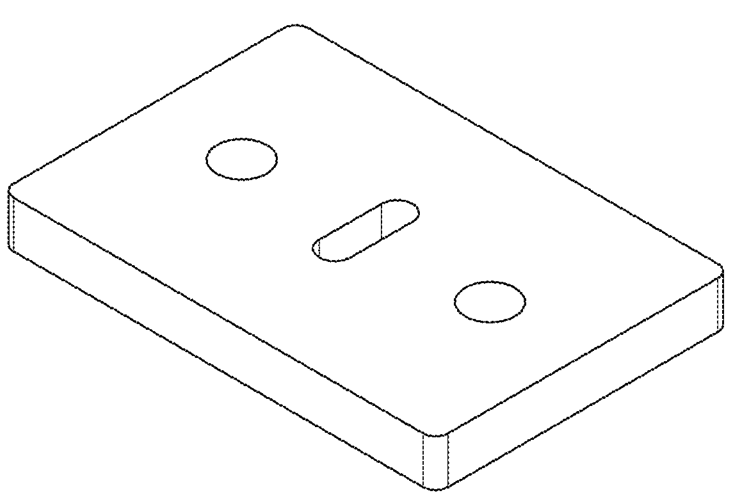
FIG. 2 shows a perspective view of a weight for the desktop cord organizer in FIG. 1 according to an embodiment, from the same perspective.

FIG. 2 shows, from the same perspective as the view in FIG. 1, an example of a weight 110 that may be disposed within the main body depicted in FIG. 1.

Figure 3:
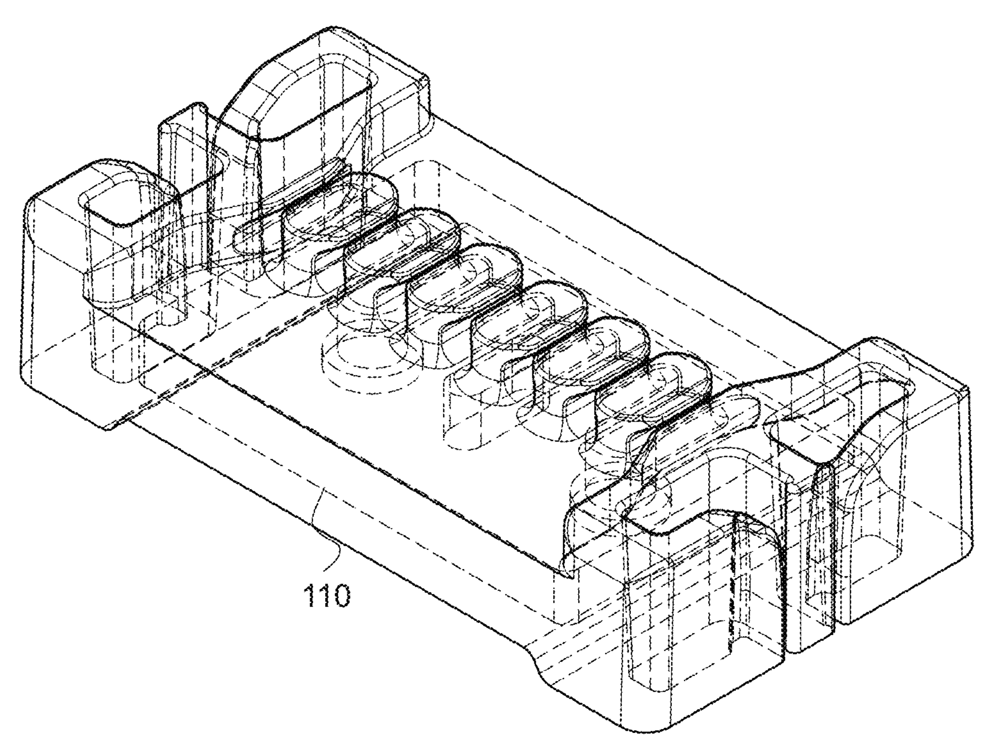
FIG. 3 shows a transparent perspective view of the desktop cord organizer of FIG. 1 and the weight of FIG. 2 inside it.

FIG. 3 shows, in dashed lines, how the weight 110 from FIG. 2 can fit within the main body of FIG. 1.

FIG. 4 illustrates the desktop cord organizer in a perspective in which the viewer may see the rear side 43, the left side 45, and the bottom side 41.

Figure 5:
FIG. 5 shows a perspective view of the weight for the desktop cord organizer in FIG. 4 according to an embodiment, from the same perspective.
Figure 5:
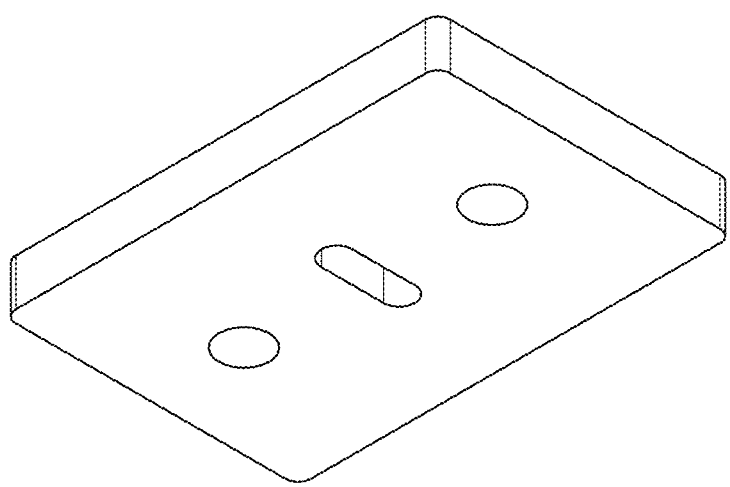

FIG. 5 shows the weight 110 from the same perspective as that depicted in FIG. 4.

Figure 6:
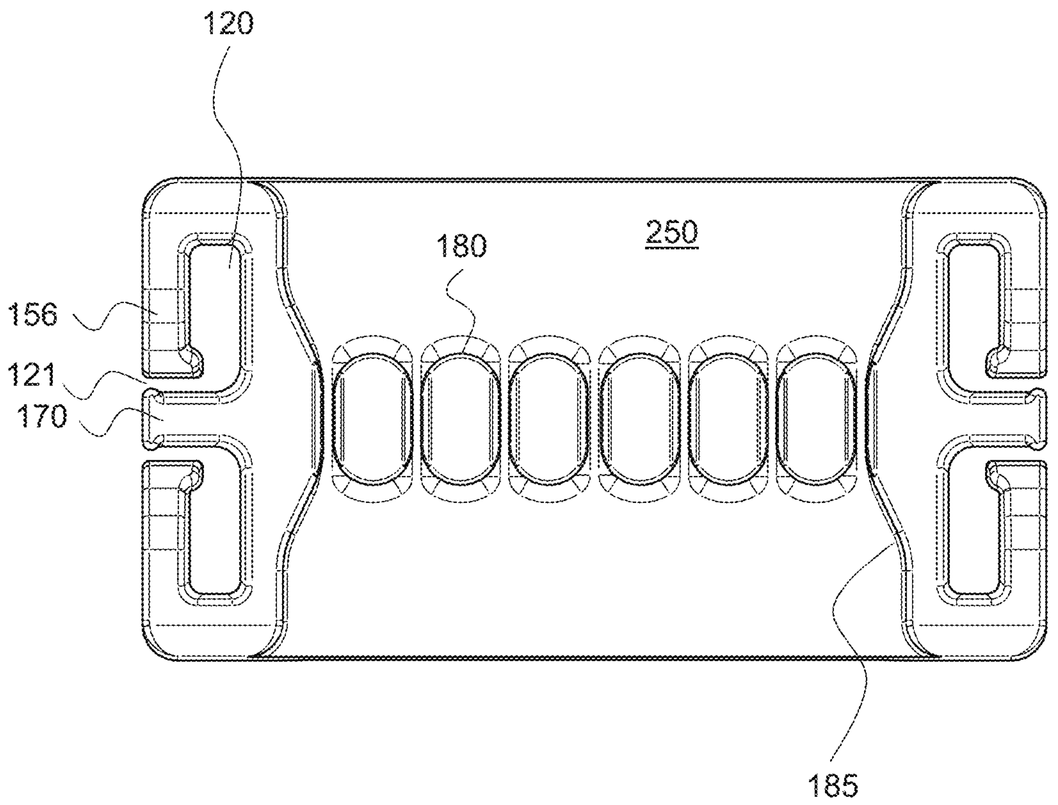
FIG. 6 shows a plan view of the desktop cord organizer, according to an embodiment.

FIG. 6 depicts, from the view of the top side 40, several features of an embodiment of the desktop cord organizer. In FIG. 6, the main body has a deck 250. The deck extends parallel to the first plane at a deck level of the main body. Islands extend generally parallel to the third axis, upward from the deck level.

From the deck 250 rise six islands. In this embodiment, each island 180 has an identical shape. In other embodiments, the islands may have different shapes or shapes that differ from each other. From this view, four instances of an end channel 120 appear. On the left, two end channels are separated by a divider 170. The divider separates the first end channel from the second end channel. The divider extends in a direction parallel to the first axis 10.

Focusing on one end channel 120, the interior communicates to the outside through an end channel passage 121. The end channel 120 is mostly enclosed by an arm 156 which is flexible. To the left, the two end channels 120 communicate outside of the main body by respective end channel passages 121. In this embodiment, each end channel has its own respective end channel passage. On the right, two other end channels are separated by another divider. Each end channel on the right has its own respective end channel passage. The end channel passages to the left open to the left side 45 and the end channel passages to the right open to the right side 44.

Figure 7:
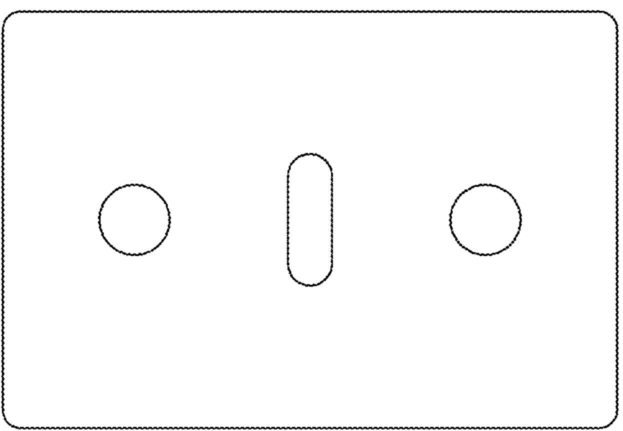
FIG. 7 shows a plan view of the weight as in FIG. 2, and also a view of the bottom of the weight.

FIG. 7 shows the weight 110 as it might be oriented within the main body when viewed from the perspective of FIG. 6.

FIG. 8 is similar to FIG. 6 but shows the desktop cord organizer from the bottom side 41. The circles, as previously discussed, are artifacts of a particular manufacturing process and may be retained for ornamental reasons or may, in other embodiments, be provided in different shapes or sizes or may be omitted entirely.

Figure 9:
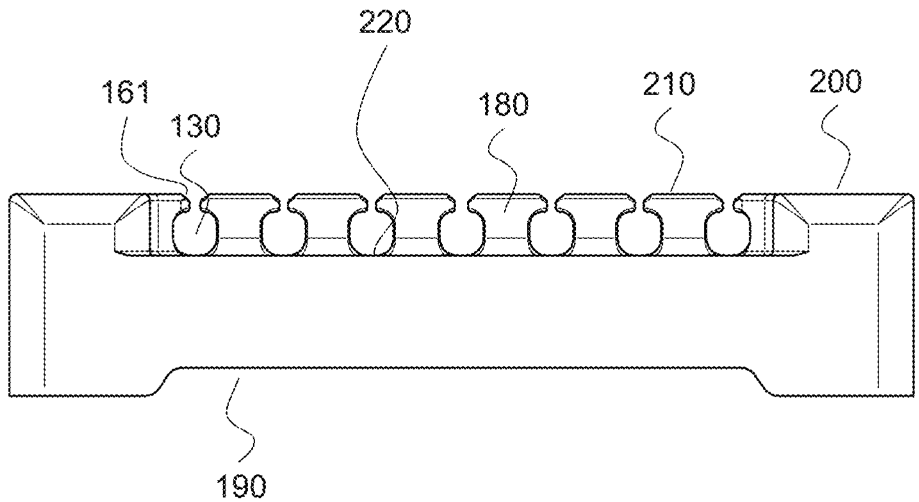
FIG. 9 shows a front side elevation view of the desktop cord organizer according to an embodiment.

FIG. 9 and FIG. 10 provide a front elevation view of the main body of the desktop cord organizer and of an example of a weight, respectively. In FIG. 9, an island 180, among five others, rises above a deck level 220 of the main body and up to an island top level 210. In other words, the islands extend upward from the deck level of the main body top side 40 in a direction generally parallel to the third axis 30. The deck level is a surface of the main body that extends generally parallel to the first plane 11.

The main body has, in the left and right areas near to where each end channel 120 is located, an upper deck level 200. In this embodiment, the island top level 210 and the upper deck level 200 are at the same height. In other embodiments, the island top level 210 is a different height from the height of the upper deck level 200. FIG. 9 shows six cable channels 130. The islands define the cable channels as do main body extensions 161 which are discussed below in more detail. The underside of the main body features a bottom channel 190. The bottom channel 190 allows the desktop cord organizer to be placed over a variety of cables, to straddle them, and to keep them somewhat confined. The height of the bottom channel 190 in other embodiments may be higher or lower than the illustrated embodiment. In one embodiment, there are two identical bottom channels separated from each other. In various embodiments, the bottom channels are of varying heights and appear in various quantities. For example, in one embodiment, a wide bottom channel occupies about two-thirds of the available space while a narrow bottom channel takes up the rest (except for a feature that separates the two).

Figure 11:
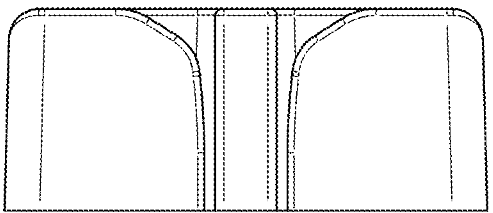
FIG. 11 shows a left side or right side elevation view of the desktop cord organizer according to an embodiment. Both views are the same for this embodiment.

FIG. 11 and FIG. 12 show, from a side elevation view, the main body and a weight, respectively, according to an embodiment.

Figure 13:
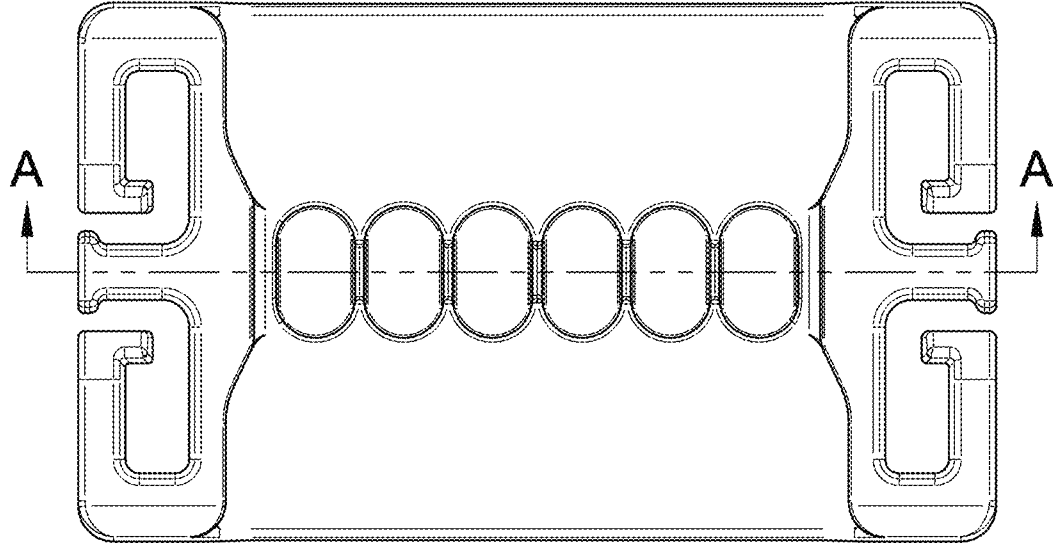
FIG. 13 shows a plan view of the desktop cord organizer, according to an embodiment, with a cross-section line A-A adjacent a cross-sectional view A of the desktop cord organizer along that line.
Figure 13:
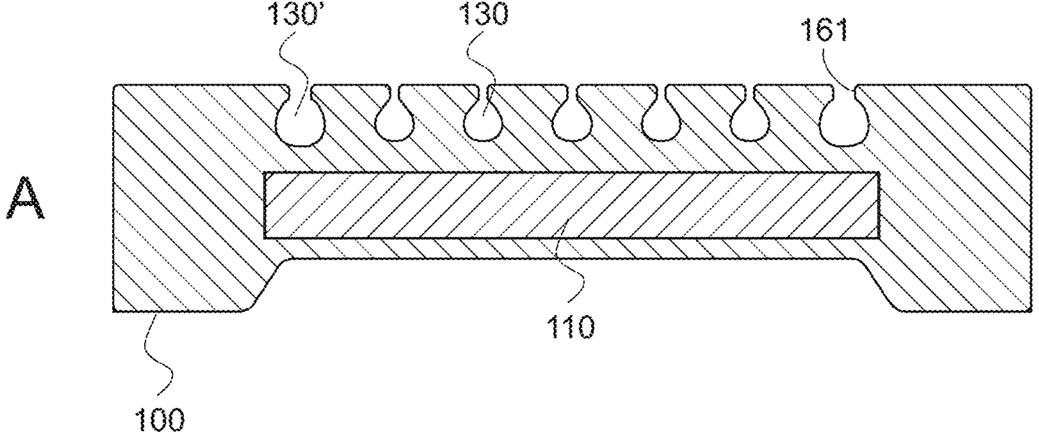

FIG. 13 depicts an embodiment similar to that of FIG. 3, but without the manufacturing artifacts (i.e., the circles) apparent in FIG. 8 as revealed by the cross section corresponding to line A-A. In this embodiment, the cable channels 130' on either side of the main body are larger in cross section than the five cable channels 130 that fall in-between. The advantage of providing some cable channels with a larger opening is that some larger cords can be accommodated. The cable channels on the far left and far right are formed in part by respective islands and in part by main body extensions 161. In other words, the larger cable channels are defined by a respective island and by a main body extension.

The five smaller channels may accept cables of the size used in charging mobile devices but might not be able to accept a larger cable such as a typical HDMI cable. The two larger cable channels can accept an HDMI cable in this embodiment. These are just examples of cables of different sizes.

Figure 14:
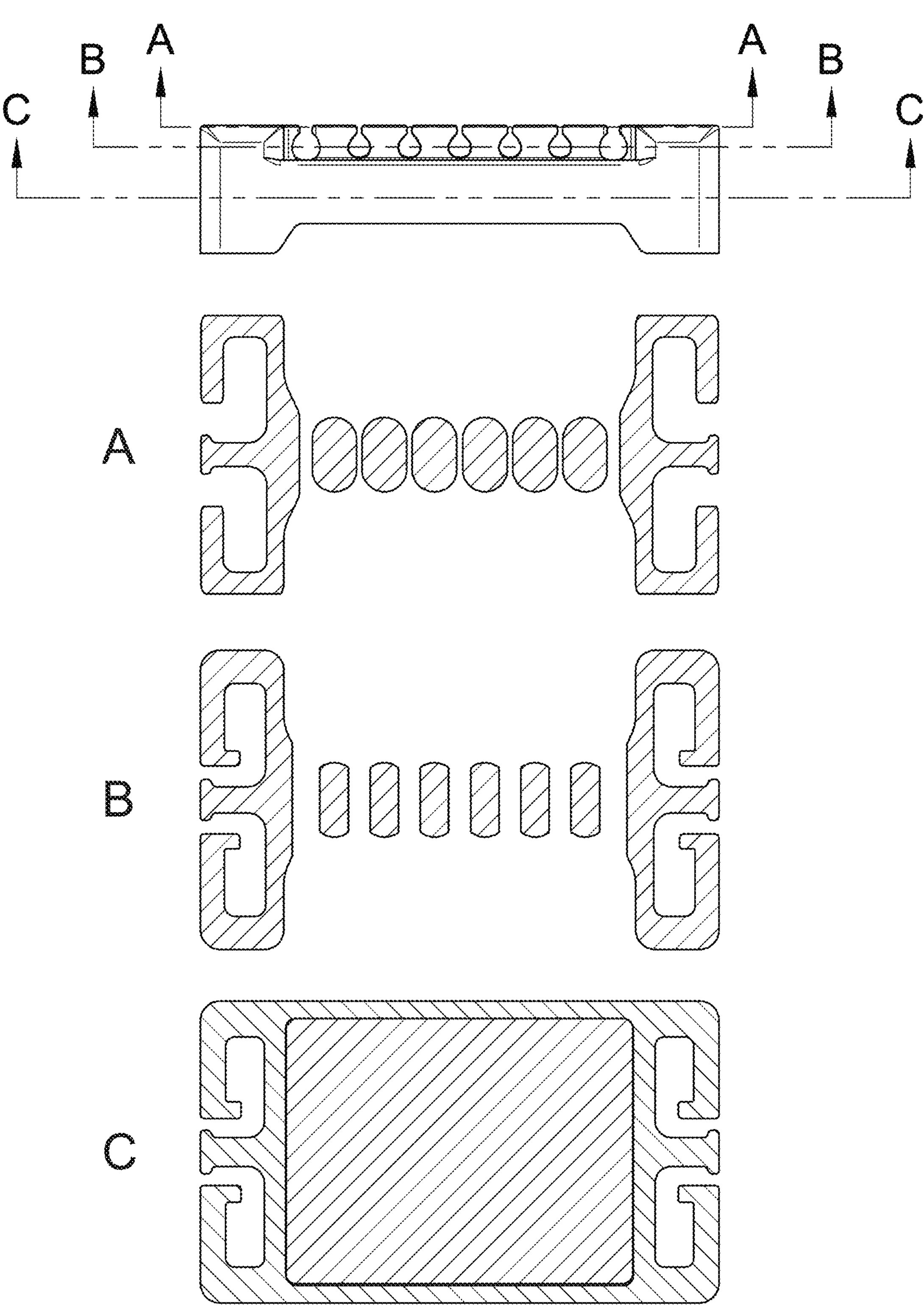
FIG. 14 shows a front side elevation view of the desktop cord organizer, according to an embodiment, with cross-section lines A-A, B-B, and C-C above cross-sectional views A, B, and C of the desktop cord organizer along those three lines, respectively.

This same embodiment appears in FIG. 14. The cross-section views help the viewer have an improved understanding of the construction of the desktop cord organizer.

Figure 15:
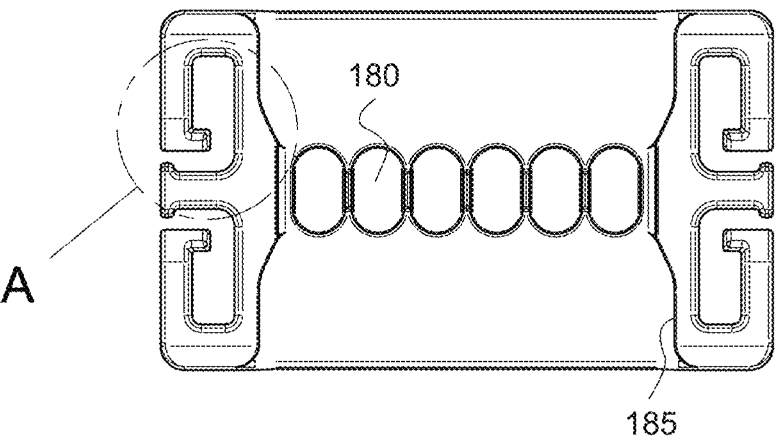
FIG. 15 shows a plan view of the desktop cord organizer, according to an embodiment, with a detailed area dashed-line circle A adjacent a detailed view of the detailed area.
Figure 15:
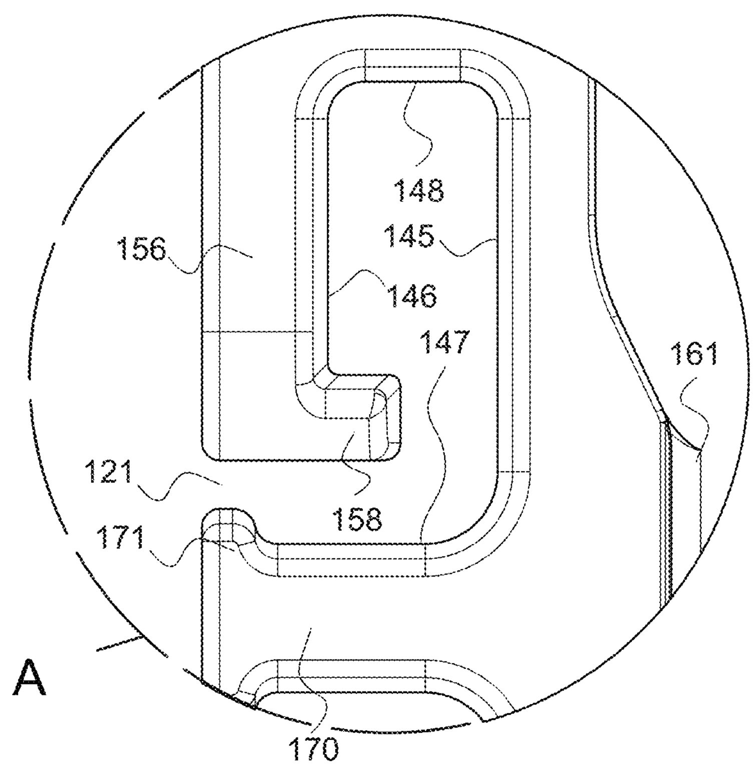

This embodiment again appears in FIG. 15 which is intended to help lay out some of the detailed features of the end channel 120. In particular, the end channel 120 has a proximal end channel wall 145 on the side nearer the central part of the main body. The end channel 120 also has a distal end channel wall 146 opposite the proximal end channel wall 145. Toward the central part of the main body, the end channel 120 has an inner end channel wall 147 and, opposite that, an outer end channel wall 148. The distal end channel wall 146 is formed by an arm 156. At the end of the arm 156 is an arm grip 158.

The arm 156 and its arm grip 158 allow the desktop cord organizer to effectively grip a mobile device and the remainder of the main body and the weight if used provide enough mass to hold the device upright. The end channel also accommodates and holds upright writing implements and Bluetooth ear buds. Because the arm 156 is flexible, it allows the end channel 120 to expand and accommodate larger marking pens, highlighters, or similar.

The inner end channel wall 147 is defined in this embodiment by a divider 170. The divider 170 separates one end channel 120 from another. The divider 170 has a divider grip 171 that cooperates with the arm grip 158 to help grip an object, such as a mobile device, that is inserted in the end channel 120. In this embodiment, the divider 170 has another divider grip 171 for the other end channel.

The gap between the arm 156 and the divider grip 171 may be thought of as an end channel passage 121. The end channel passage 121 communicates from an interior of the end channel to outside the main body. In the embodiment illustrated in FIG. 15, all of the end channels have such end channel passages. In other embodiments, one or more end channels do not have end channel passages, namely, they are closed up along the side and are simply through-holes into which a user may place heavy writing implements or other items such as tools that might not stand upright in an end channel that has an end channel passage.

FIG. 15 also shows the main body extension 161 which was previously mentioned. The main body extension 161 extends The main body extension 161 forms part of one of the cable channels. In this embodiment, the main body extension 161 forms part of one of the larger cable channels.

FIG. 15 also shows a cut-in 185 which is discussed in more detail below.

Figure 16:
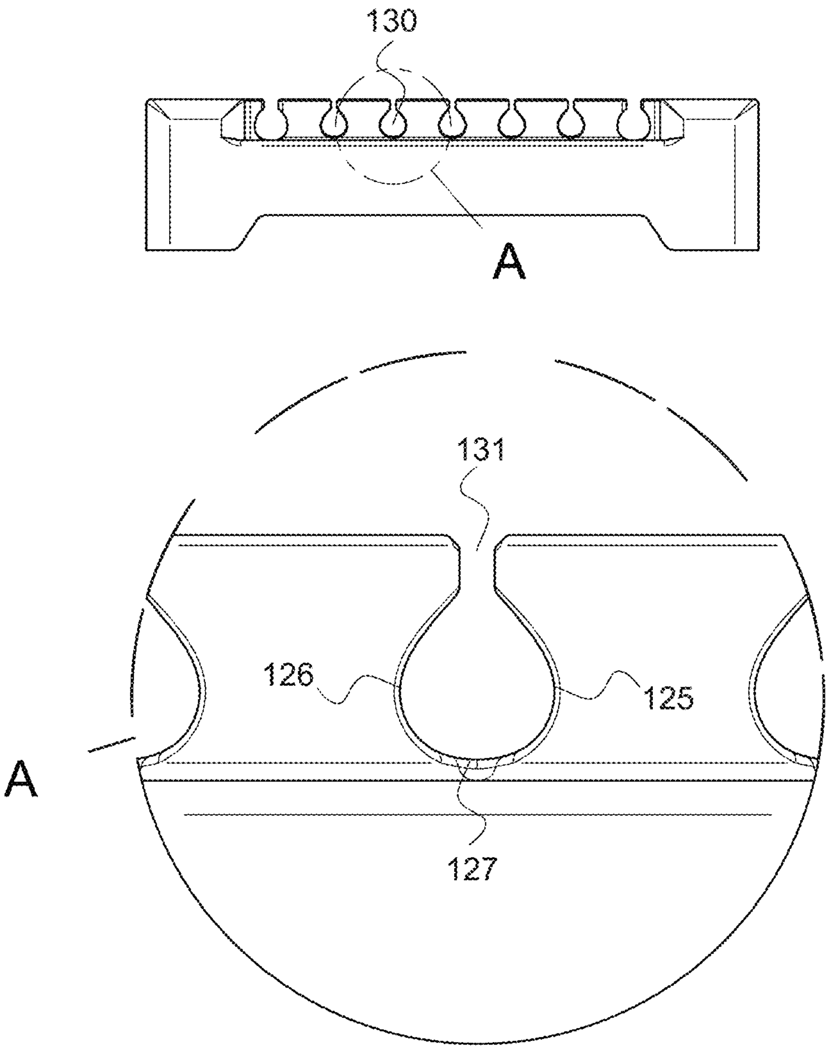
FIG. 16 shows a front elevation view of the desktop cord organizer, according to an embodiment, with a detailed area dashed-line circle A adjacent to a detailed view of the detailed area.

FIG. 16 shows, in detail, one cable channel 130. In this view, one island 180 defines a proximal cable channel wall 125 and another defines a distal cable channel wall 126. Here, proximal means that the wall is closer to the central part of the main body. The proximal and distal cable channel walls may be thought of more generally as cable channel walls. Also, in this view inner cable channel wall 127 defines the lower part of the cable channel on which an inserted cable would rest. The islands are shaped to define a cable channel passage 131. The cable channel passage 131 communicates from the inside of the cable channel to outside of the main body.

In this embodiment, the cable channel 130 has a rounded, teardrop cross section. In other embodiments, the cross section of the cable channel 130 is more of a rounded square or a rounded triangle. In still other embodiments, the cross section of the cable channel 130 is elongate and forms a slot into which multiple cables may be held.

Figure 17:
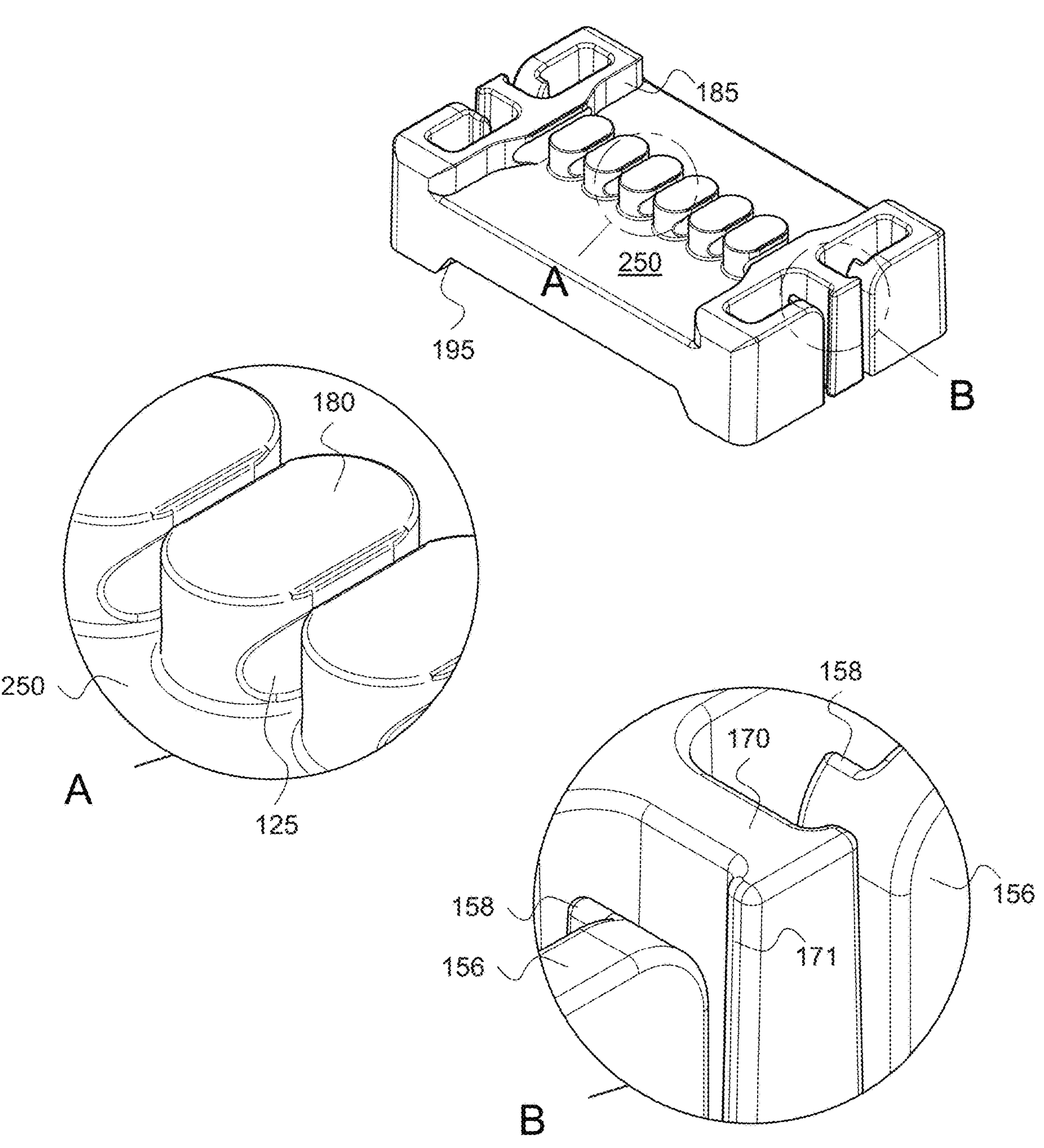
FIG. 17 shows a perspective view of the desktop cord organizer, according to an embodiment, with detailed area dashed-line circles A and B above detailed area views of the detailed areas.

FIG. 17 gives a perspective view of an island 180 in detail circle A. The detail view shows proximal cable channel wall 125 but the distal cable channel wall 126 is occluded. The island 180 rises from the deck 250 with a profile that, in this embodiment, is rounded. In other embodiments, the islands have less rounded profiles. In this embodiment, the islands appear from the top side 40 as ovals. In other embodiments, the islands appear from the top as circles or rounded rectangles.

Note the deck 250. In this embodiment, the deck is broad enough to neatly and cleanly support cable ends of various sizes. For example, the deck in this embodiment accommodates a USB-C or lightning cable connector without any or without much overlap of the connector beyond the edge of the desktop cord organizer. This gives the user's desktop an attractive and orderly look when the user is not actively using the cables. Also note the cut-in 185 that helps define the shape of the deck 250. The cut-in 185 is adapted to fit the contours of cable ends that have connectors such as USB-C or lightning connectors. In other embodiments, the cut-in 185 is adapted to fit the typical shape of other cable ends.

FIG. 17 also shows a cutout 195 at the underside of the main body. This cutout 195 defines the bottom channel 190 which has been previously discussed.

The detail view B of FIG. 17 shows parts of two end channels in perspective. In this embodiment, two end channels are separated by divider 170. The divider 170 has a divider grip 171 on each side of its distal end. Part of the arm 156 defines one side of the end channel and part of the divider grip 171 defines the other side. The view shows how the arm grip 158, in this embodiment, is tapered on its upper end. This helps avoid catching the arm grip 158 on other objects such as a user's finger, for example. This taper is also evident in cross-section views A and B of FIG. 14.

In general, the embodiments illustrated in these drawing figures depict four vertical end channels that extend through the main body. Four flexible arms, two central dividers, and four inner end channel walls of the main body define the four end channels. The end channels can hold mobile phones, tablets, or other flat devices in portrait or landscape orientations. The perpendicular orientation allows for stable positioning at various angles for optimal viewing or interaction. The flexible arms, which form "L" shapes, provide secure slots for pens, rulers, or other objects. Because the arms are made from a non-slip material such as silicone, they offer a grippy surface for holding notepads, business cards, or even wireless earbuds.

Seven horizontal cable channels in this embodiment are defined by six islands that extend upward from a deck of the main body to an island top level of the main body. An upper deck level is at the same height as the island top level in this embodiment but is a different height in other embodiments. The islands, together with left and right portions of the main body that extend from the bottom of the main body to the upper deck level at the top, define the horizontal cable channels.

The interior cross-sections of the end channels are generally rectangular but have rounded interior corners in this embodiment. The arms have arm grips that help retain things inside the vertical end channels. The central dividers also have divider grips to help retain things as well. The arm grips and the divider grips also help grip things like mobile devices.

The islands, in this embodiment, do not extend all the way from the main body front side to the main body back side but allow for a deck that works as a support surface for the cable ends when they are not in use. The top support surface helps support any cord or cable connectors when they are not plugged into a device, keeping such connectors out of the way. The cut-ins allow the deck next to the endmost cable channels to support connectors as well.

The end channels have end channel passages that communicate from an interior of the end channel to outside of the main body. By moving the arms, the end channels can receive large objects such as mobile devices.

The cable channels in this embodiment have generally round or teardrop shapes. Cable channel passages lead from the interior of the cable channels to outside of the main body.

A cutout at the bottom of the main body defines one or more bottom channels. Laying the main body on top of cables thereby holds such cables generally in place while allowing for some cable movement. With suitable modifications, the main body can have multiple cutouts that define multiple bottom channels.

The cable channels in this embodiment communicate between the first pair of sides, namely, between the main body front side and the main body rear side. The end channels in this embodiment communicate between the top side 40 and the bottom side 41.

To make it easier for a user to push cables into the cable channels through the cable channel passages, the tops of the islands have rounded edges.

Other Embodiments

Some alternative embodiments have a different number of islands or a different number of cable channels. Other alternative embodiments have only one end channel on a side. Still other alternative embodiments omit the divider. Yet other alternative embodiments provide cable or end channels with cross-sectional shapes other than those shown herein.

The weight, as illustrated, is a simple piece of high-density material such as steel. In alternative embodiments, the weight is a magnet and enables the cord organizer to attach to suitable surfaces using magnetic attraction. In other alternative embodiments, the weight is a mobile device charger containing one or more batteries. Such a charger has suitable ports for charging the mobile device and, if needed, for recharging the batteries inside the charger. In a variant of this alternative embodiment, the mobile device charger's ports open to a side of the cord organizer. In another variant, the mobile device charger's ports are not exposed in this manner, but the charger is removable from the main body and its ports can then be accessed by the user.

In a further alternative embodiment, the main body stores a portable Bluetooth speaker therein, providing a handy way to transport and protect the speaker at the same time. In another alternative embodiment, a kit comprises the main body, the portable Bluetooth speaker, and also the weight. When the user takes the portable speaker out of the main body to use it, the user replaces the weight in the weight cavity so that the cord organizer can resist forces that may work to slide it from where it rests.

In one further alternative embodiment, the weight is replaced with a device that has a radio component such as an RF receiver/transmitter and a light controller. The radio component allows for wireless connectivity via a protocol that the light controller can understand. The light controller accepts commands, input via the radio component and passed on to the light controller, that result in the light controller controlling lights, such as at least one LED light, lights, or other light sources, that are embedded in the elastomeric material. By way of a mobile device app, for example, a user may send signals to the receiver/transmitter. The light controller, which may include a processor, may respond to the signals and turn the lights on, off, or to do so in a pattern. In this embodiment, the cord organizer can provide decorative light or can act as a night light.

In the illustrated embodiments, the cable channel passages and the end channel passages are depicted as generally straight slits. In some alternative embodiments, to help the cable channel retain a cord, the generally straight slit is replaced with a flap that has a jagged parts like teeth or is shaped like an arrow or has scallops.

The desk organizer's unique channel combination allows for multiple configurations and uses. Phones can be securely held in the end channels in either portrait or landscape mode depending on user preference and object type. The channels and weighted base also ensure stability even when holding devices or multiple items.

Additional channels and spaces can be used for storing or gathering charging cables, minimizing clutter, and maximizing workspace organization.

The desktop organizer, in various sizes, accommodates different cable sizes, and for phones and tablets, suits various organizational needs. Different sizes and weights can be achieved, as well as varying textures for increased design appeal.

A range of color options personalize the organizer and complement different workspace aesthetics.

The desktop cord organizers described above have a number of features in common. Not only do they hold cords in place on a horizontal surface without resorting to adhesives, but they also help a user stand up their mobile device and give the user an easy way to wrap up their mobile device cords around the organizer for tidy transport. That said, it is possible for many embodiments to exist without having every one of these benefits. The appended claims should be consulted to see whether a given device falls within the scope and spirit of the invention. Other features and other functions will occur to those familiar with this field and such variations are to be expected to follow in the light of the complete and detailed examples provided above. Such variations need not, however, be considered beyond the reach of the appended claims.

What is claimed is:

1. An apparatus, comprising:

a main body having dimensions, the dimensions of the main body comprising a main body length along a first axis, a main body width along a second axis perpendicular to the first axis, and a main body height along a third axis perpendicular to the first axis and to the second axis;

the first axis and the second axis defining a first plane, the first axis and the third axis defining a second plane, and the second axis and the third axis defining a third plane;

the first axis, the second axis, and the third axis intersecting at a common reference point of the main body and defining axes of the main body;

the main body further having pairs of sides including a first pair of the sides, a second pair of the sides, and a third pair of the sides, the first pair of the sides comprising a main body front side before the second plane and a main body rear side behind the second plane, the second pair of the sides comprising a main body top side above the first plane and a main body bottom side below the first plane, and the third pair of the sides comprising a main body left side and a main body right side;

the first pair of the sides, the second pair of the sides, and the third pair of the sides defining the sides of the main body;

the main body comprising flexible material;

the main body further comprising a first end channel communicating between the main body top side and the main body bottom side;

the first end channel having a first end channel passage that communicates from an interior of the first end channel to outside of the main body through one of the third pair of the sides;

a second end channel communicating between the main body top side and the main body bottom side;

the second end channel having a second end channel passage that communicates between a same one of the third pair of the sides; and the main body having a divider separating the first end channel from the second end channel and extending in a direction parallel to the first axis.

2. The apparatus of claim 1, further comprising the main body having a cutout, at the main body bottom side, defining a bottom channel.

3. The apparatus of claim 1, further comprising:

the first end channel having a first proximal end channel wall and a first distal end channel wall, the first proximal end channel wall being nearer the common reference point than the first distal end channel wall; and the first distal end channel wall being formed by a first arm.

4. The apparatus of claim 3, further comprising the divider having a divider grip that defines part of the first end channel.

5. The apparatus of claim 4, further comprising the first arm having a first arm grip, at an end of the first arm.

6. The apparatus of claim 1, further comprising the main body being made of an elastomeric material.

7. The apparatus of claim 1, further comprising a weight-cavity in an interior of the main body.

8. The apparatus of claim 7, further comprising a weight in the weight cavity.

9. The apparatus of claim 8, further comprising the weight being made of a material having a respective density greater than the respective density of the main body.

10. The apparatus of claim 9, further comprising the weight being made of steel.

11. An apparatus comprising:

a main body having dimensions, the dimensions of the main body comprising a main body length along a first axis, a main body width along a second axis perpendicular to the first axis, and a main body height along a third axis perpendicular to the first axis and to the second axis;

the first axis and the second axis defining a first plane, the first axis and the third axis defining a second plane, and the second axis and the third axis defining a third plane;

the first axis, the second axis, and the third axis intersecting at a common reference point of the main body and defining axes of the main body;

the main body further having pairs of sides including a first pair of the sides, a second pair of the sides, and a third pair of the sides, the first pair of the sides comprising a main body front side before the second plane and a main body rear side behind the second plane, the second pair of the sides comprising a main body top side above the first plane and a main body bottom side below the first plane, and the third pair of the sides comprising a main body left side and a main body right side;

the first pair of the sides, the second pair of the sides, and the third pair of the sides defining the sides of the main body;

the main body comprising flexible material;

the main body further comprising a first end channel communicating between the main body top side and the main body bottom side;

the first end channel having a first end channel passage that communicates from an interior of the first end channel to outside of the main body through one of the third pair of the sides;

the main body having a deck that extends parallel to the first plane at a deck level;

islands extending, generally parallel to the third axis, upward from the deck level to an island top level; and a first cable channel formed between two adjacent ones of the islands.

12. The apparatus of claim 11, further comprising the first cable channel having a first cable channel passage that communicates from an interior of the first cable channel to outside of the main body through the main body top side.

13. The apparatus of claim 12, further comprising the first cable channel having a rounded, teardrop cross section.

14. The apparatus of claim 12, further comprising:

a second cable channel formed between one of the islands and a main body extension; and the second cable channel having a second cable channel passage that communicates from an interior of the second cable channel to outside of the main body through the main body top side.

15. The apparatus of claim 14, further comprising the first cable channel having a respective cross section different in size from a respective cross section of the second cable channel.

16. An apparatus comprising:

a main body having dimensions, the dimensions of the main body comprising a main body length along a first axis, a main body width along a second axis perpendicular to the first axis, and a main body height along a third axis perpendicular to the first axis and to the second axis;

the first axis and the second axis defining a first plane, the first axis and the third axis defining a second plane, and the second axis and the third axis defining a third plane;

the first axis, the second axis, and the third axis intersecting at a common reference point of the main body and defining axes of the main body;

the main body further having pairs of sides including a first pair of the sides, a second pair of the sides, and a third pair of the sides, the first pair of the sides comprising a main body front side before the second plane and a main body rear side behind the second plane, the second pair of the sides comprising a main body top side above the first plane and a main body bottom side below the first plane, and the third pair of the sides comprising a main body left side and a main body right side;

the first pair of the sides, the second pair of the sides, and the third pair of the sides defining the sides of the main body;

the main body comprising flexible material;

the main body further comprising a first end channel communicating between the main body top side and the main body bottom side;

the first end channel having a first end channel passage that communicates from an interior of the first end channel to outside of the main body through one of the third pair of the sides;

a cavity in an interior of the main body, and a mobile device charger in the cavity.

17. An apparatus, comprising:

a main body having dimensions the dimensions of the main body comprising a main body length along a first axis, a main body width along a second axis perpendicular to the first axis, and a main body height along a third axis perpendicular to the first axis and to the second axis;

the first axis and the second axis defining a first plane, the first axis and the third axis defining a second plane, and the second axis and the third axis defining a third plane;

the first axis, the second axis, and the third axis intersecting at a common reference point of the main body and defining axes of the main body;

the main body further having pairs of sides including a first pair of the sides, a second pair of the sides, and a third pair of the sides, the first pair of the sides comprising a main body front side before the second plane and a main body rear side behind the second plane, the second pair of the sides comprising a main body top side above the first plane and a main body bottom side below the first plane, and the third pair of the sides comprising a main body left side and a main body right side;

the first pair of the sides, the second pair of the sides, and the third pair of the sides defining the sides of the main body;

the main body comprising flexible material;

the main body further comprising a first end channel communicating between the main body top side and the main body bottom side;

the first end channel having a first end channel passage that communicates from an interior of the first end channel to outside of the main body through one of the third pair of the sides;

a cavity in an interior of the main body; and a speaker in the cavity.

* * * * *